United States Patent [19]

Teuber-Ernst

[11] Patent Number: 5,394,692
[45] Date of Patent: Mar. 7, 1995

[54] SOOT FILTER WITH HOT GAS GENERATOR

[75] Inventor: Hildemarie Teuber-Ernst, Hagen, Germany

[73] Assignee: Ernst-Apparatebau GmbH & Co., Hagen, Germany

[21] Appl. No.: 68,244

[22] Filed: May 27, 1993

[30] Foreign Application Priority Data

Aug. 14, 1992 [DE] Germany ............... 42 26 901.6

[51] Int. Cl.$^6$ ................................................ F01N 3/02
[52] U.S. Cl. ................................. 60/303; 55/466; 55/DIG. 30
[58] Field of Search ................... 60/286, 303; 55/DIG. 30, 466

[56] References Cited

U.S. PATENT DOCUMENTS

| 4,573,319 | 3/1986 | Ludecke. |
| 4,622,810 | 11/1986 | Shinsei ................... 60/303 |
| 4,899,540 | 2/1990 | Wagner et al. . |

FOREIGN PATENT DOCUMENTS 3545437 7/1987 Germany.

*Primary Examiner*—Douglas Hart
*Attorney, Agent, or Firm*—Herbert Dubno

[57] ABSTRACT

A soot filter for diesel engines which is attached to the motor vehicle and has attached to the exhaust pipe a filter casing in which the filters are attached, which can be regenerated by hot gases, the filter casing attached to the motor vehicle having instead of an internal hot gas generator a connection to which an external mobile hot gas generator can be releasably connected, the engine exhaust gas supply being closed when the hot gas generator is connected.

11 Claims, 4 Drawing Sheets

_ _ _

SOOT FILTER WITH HOT GAS GENERATOR

SPECIFICATION

1. Field of the Invention

The invention relates to a soot filter for diesel engines which is attached to the motor vehicle and has attached to the exhaust pipe a filter casing in which filters are received, which can be regenerated by hot gases.

2. Background of the Invention

It is known to attach soot filters releasably to the motor vehicle, providing no burner, so that at the end of a day the soot filter can be removed from the motor vehicle and placed in an apparatus containing a burner which burns off the accumulated soot. The regular detachment of the filter from the motor vehicle and its subsequent reattachment is very costly in labor and involves a risk of injury, since on the arrival of the motor vehicle the filter casings are very hot.

Object of the Invention

It is an object of the invention to provide a constructionally simple, inexpensive and readily handleable soot filter system which has small external dimensions, is reliable and is sealing-tight, and which is inexpensive with respect to labor cost and has a short regeneration time.

Summary of the Invention

This object is attained according to the invention in a filter assembly wherein the filter casing attached to the motor vehicle has instead of an internal hot gas generator a connection to which an external mobile hot gas generator can be releasably connected, the engine exhaust gas supply being closed when the external hot gas generator is connected to the filter for regeneration.

As a result, the filter can always remain on the motor vehicle, since the mobile regeneration device can be connected to the motor vehicle. Handling is simple and involves no risk of injury. The filter casing has small external dimensions and the whole filter is structurally simple and inexpensive to produce.

Since with the hot gas generator connected, the engine exhaust gas supply to the filter is closed off, the hot gases for generation are automatically prevented from being able to pass into the motor car engine. The closing of the engine exhaust pipe also ensures that the engine is automatically stopped and cannot be restarted as long as the exhaust pipe is closed.

Preferably according to the invention the connection of the filter casing has a branch having a first inlet connected to the exhaust pipe, an outlet extending to the filter and a second inlet to which the hot gas generator can be releasably connected. This is a simple construction ensuring reliable and ready handling.

A particularly simple and readily and reliably handleable construction provided that attached to the hot gas generator is a pipe whose free end is releasably attached to the branch, the first inlet being closed in the attached state. The first inlet can be closed by the insertion of the pipe of the hot gas generator into the second inlet.

A smooth flow of the exhaust gases during travel and a ready accessibility of the branch to the hot gas generator is ensured if the second inlet is disposed transversely of the first inlet and the outlet. The side wall of the pipe is formed adjacent its free end with an outlet opening which opens in the direction of the outlet. Also advantageously the wall of the pipe closes the first inlet.

Alternatively according to the invention the first inlet is disposed transversely of the second inlet and the outlet.

High flexibility and adaptability to exhaust pipes of different diameters is achieved if the pipe is connected to the hot gas generator via an intermediate coupling member. Pipes of different diameter are releasably attachable to the intermediate coupling member on the side remote from the hot gas generator.

A satisfactory seal is achieved if the second inlet has an internal diameter substantially corresponding to the external diameter of the pipe. It is of the greatest advantage if the branch has internally a recess whose internal diameter corresponds to the external diameter of the pipe and in which the free end of the pipe is disposed. As a result, the hot gas generator is reliably retained, so that the user has both hands free for opening and closing the closure.

A constructionally particularly simple and readily handleable hot gas generator can have an oil or gas burner downstream of whose combustion chamber in the direction of gas flow a heating chamber is disposed into which the flame gases pass and whose inner wall is formed with openings through which the air can be supplied.

Particularly advantageously the hot gas generator generating the hot air is attached to the end of a flexible hose and/or a pipe which connects the burner to a carriage, containing further components, of the regeneration unit, the burner being readily attachable via a short connecting member to the soot filter casing. As a result, hot gas does not flow through a considerable length of connecting hose between the mobile station and the motor vehicle filter casing, thereby reducing the risk of injury and ensuring that the hot gas will enter the filter at an optimum temperature level.

BRIEF DESCRIPTION OF THE DRAWING

Four embodiments of the invention will now be described in greater detail with reference to in the accompanying drawing, wherein.

SPECIFIC DESCRIPTION

Figure 1:
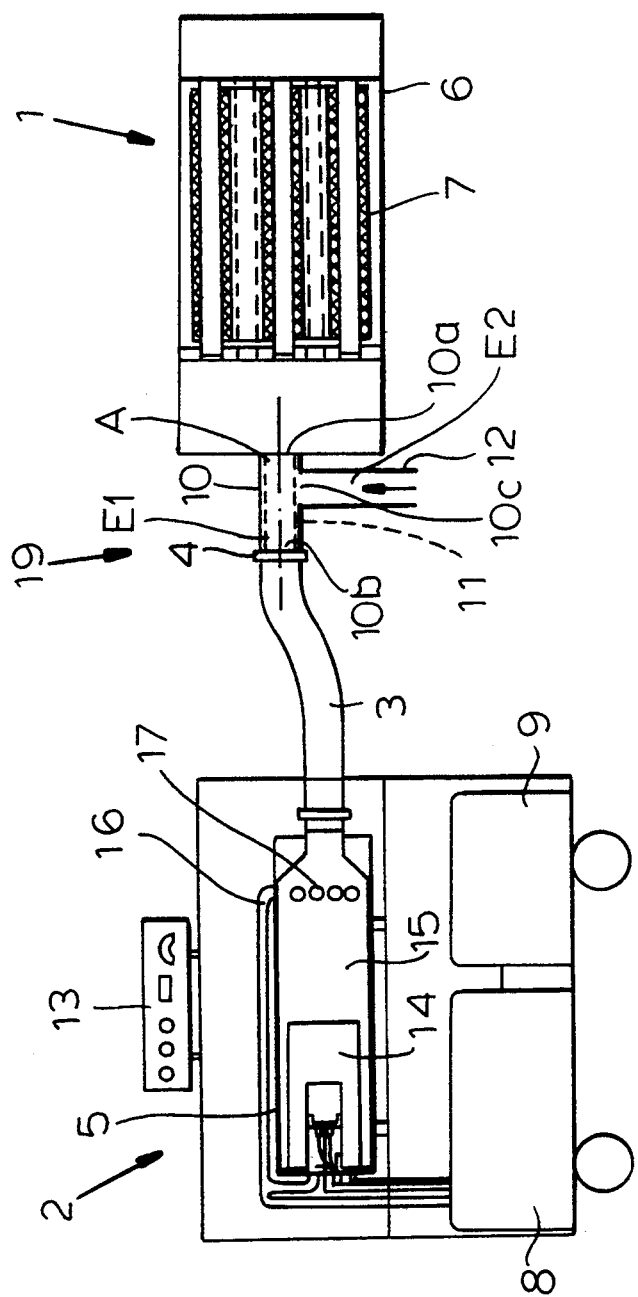
FIG. 1 is a vertical section which shows a first embodiment with a filter/filter casing attached to the motor vehicle, which itself is not shown.

In the filter system with external regeneration according to the invention, a filter 1 is releasably attached to a motor vehicle, and a regeneration unit 2 is provided separately therefrom. The system is used on vehicles which visit a station once a day for the regeneration of the filter. The size of the filter 1 is such that it has a charging duration of 1.5 to 2 days. When at the end of its travel the vehicle arrives at the regenerating station with its external mobile regeneration unit 2, the regeneration device is coupled to the filter via a thermally insulated flexible hot gas hose 3. This is done via a rapid closure 4.

The core of the regeneration unit 2 is a pure gas burner 5 producing from sucked-in fresh air a hot gas at approximately 700–800 degrees. During regeneration the hot air flows through the filter 1, where it ignites the accumulated soot. In dependence on the size of the filter, after about 5 to 7 minutes the filter has been burnt free and the vehicle is again ready for operation. Thereafter the regeneration unit 2 is available for cleaning further filters.

The filter 1 has a high-temperature-resistant steel casing 6 in which ceramic wound filter plugs are disposed. The exhaust gases enter the filter casing 6 and flow through the filter plugs 7 disposed therein. The particles of soot with their deposited hydrocarbons are held back by the ceramic wound plugs 7, so that only purified gas emerges from the filter 1.

Due to the modular construction of the filter 1, it can be adapted to any type of vehicle. The number of filter plugs 7 is determined by the data specific to the vehicle, such as piston-swept volume, power and condition of the engine. On the basis of these data the filter is so dimensioned that it makes possible a charging duration of 1.5 to 2 days, in dependence on requirements.

An indicator disposed in the driver's cab always shows the driver the charging state of the filter 1. The exhaust gas counter-pressure is a value characteristic of the charging state of the filter.

The regeneration unit 2 has a pure gas burner 5, a components box 8, a fuel tank 9 and an operating unit 13. The hot gas burner 5 has a combustion chamber 14 extending into a heating chamber 15 which is circularly enclosed by an outside chamber 16 to which fresh air is supplied which passes into the heating chamber 15 via openings 17 in the wall thereof. As a result, the combustion, flame path and cooling are optimized.

Attached to the pure gas burner 5 on the outlet side is a thermally insulated hot gas hose 3 which is connected via a rapid closure 4 to the charged filter 1. A T-shaped pipe 10 is attached as a branch 19 to the filter inlet. A first inlet E1 serves for the supply of the exhaust gas to the filter and is connected to the engine, the other end 10b extending to the outside of the vehicle, where it forms a second inlet E2 and is closed via a blank flange and a rapid closure 4. This end is thermally insulated. For regeneration, the blank flange is removed and the hot gas hose 3 attached. During regeneration, therefore, the filter remains on the vehicle, the inflow of the air at a temperature of approximately 700–800 degrees into the exhaust gas line adjacent the engine being constructionally prevented, as follows: a tubular member 11 disposed at the end of the hot gas connecting hose 3 acts as a connecting pipe which can be inserted into the pipe 10. Exhaust pipe 12 of the diesel engine discharges as an inlet E1 into the pipe 10, so that when the tubular member 11 is inserted, the mouth of the inlet E1 is closed.

Like the hot gas hose 3 and the filter 1, the pure gas burner 5 is also insulated. The regeneration unit 2 is supplied with 220 volts, the electric power consumption being approximately 1.2 kW. The regeneration unit is disposed in a portable cupboard.

The burner 5 can be started only when the hot gas hose 3 is flanged to the filter 1. The fuel needed for combustion is taken from the fuel tank 9 by a pump. The combustion generates a heating power of approximately 25 kW with a fuel consumption of approximately 2 liters per hour. The regeneration time is between 5 and 7 minutes, in dependence upon filter size. The insertion of a punched card in the operating unit 13 automatically starts regeneration specific to the vehicle. The illumination of a lamp indicates the end of the regeneration time.

During the regeneration, the regeneration time still remaining is outputted on a digital display. This enables the operator to estimate how soon a regeneration which has begun can be terminated if the vehicle in question is required at that moment for a job. A regeneration can be interrupted by pressing the stop button. A tank display indicates the fuel reserve. A thermometer disposed on the filter delivers a signal for resetting the charging indication in the driver's cab if the filter has been subjected to a temperature above 650 degrees for a long enough period.

Figure 2:
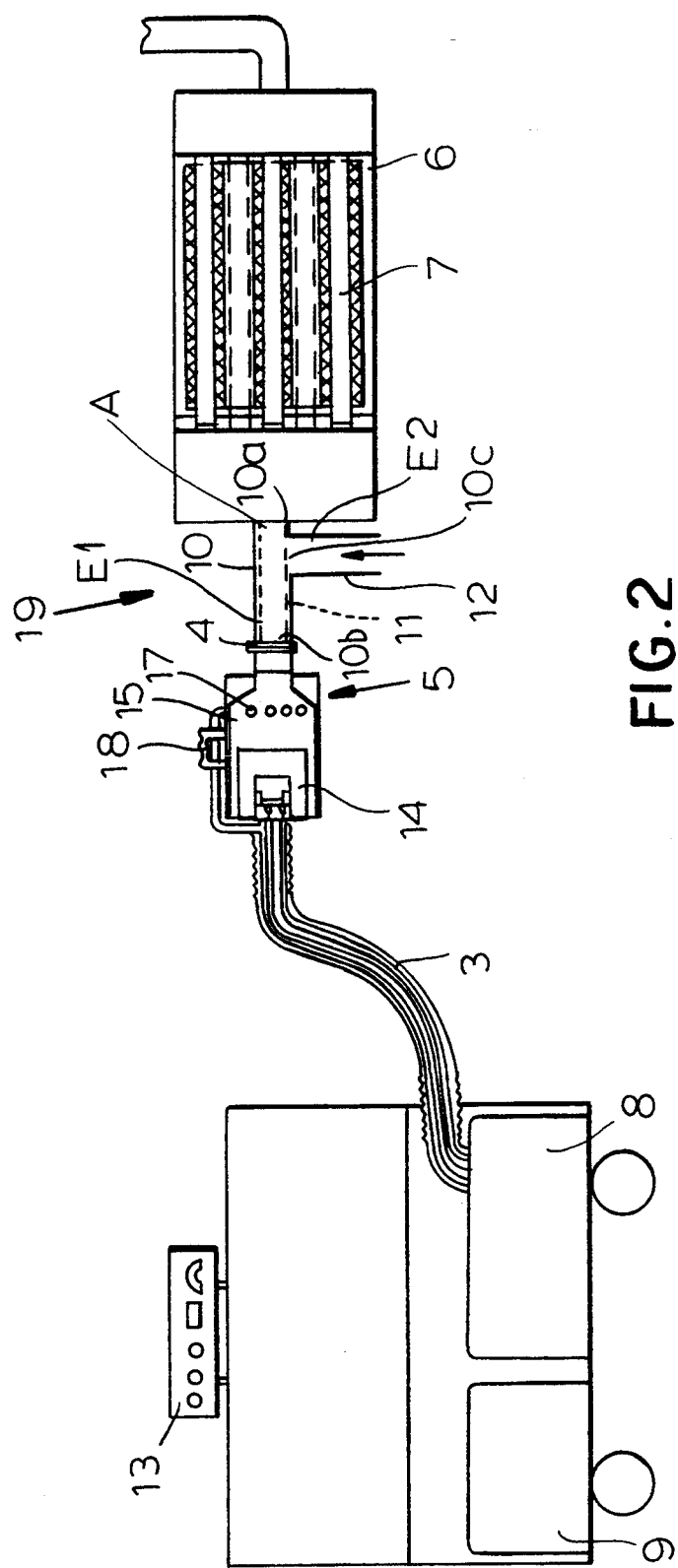
FIG. 2 is a vertical section through a second embodiment.

In the second embodiment (FIG. 2) the burner 5 is not disposed inside or outside the regeneration unit 2, but attached to the outer end of the hose 3 connecting the regeneration unit 2 to the filter 1. The burner 5 is therefore a portable, movable unit with a top handle 18 which can be attached to the filter casing 6 via its projecting connection (connecting pipe 11) in the same manner as disclosed hereinbefore concerning the hose 3. As a result, hot gases no longer flow through the hose 3.

Figure 3:
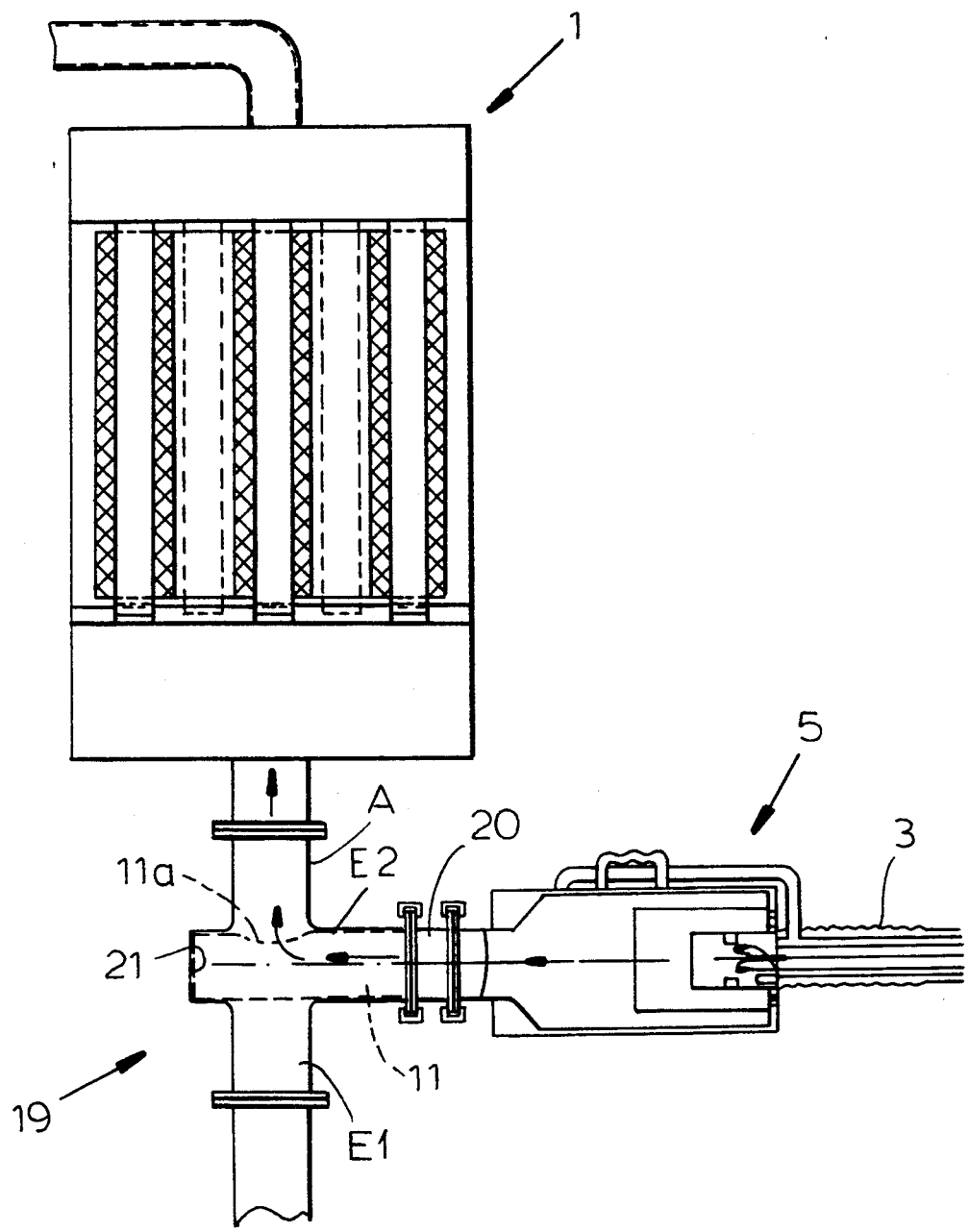
FIG. 3 is another vertical section which shows a third embodiment with a thinner exhaust pipe.
Figure 4:
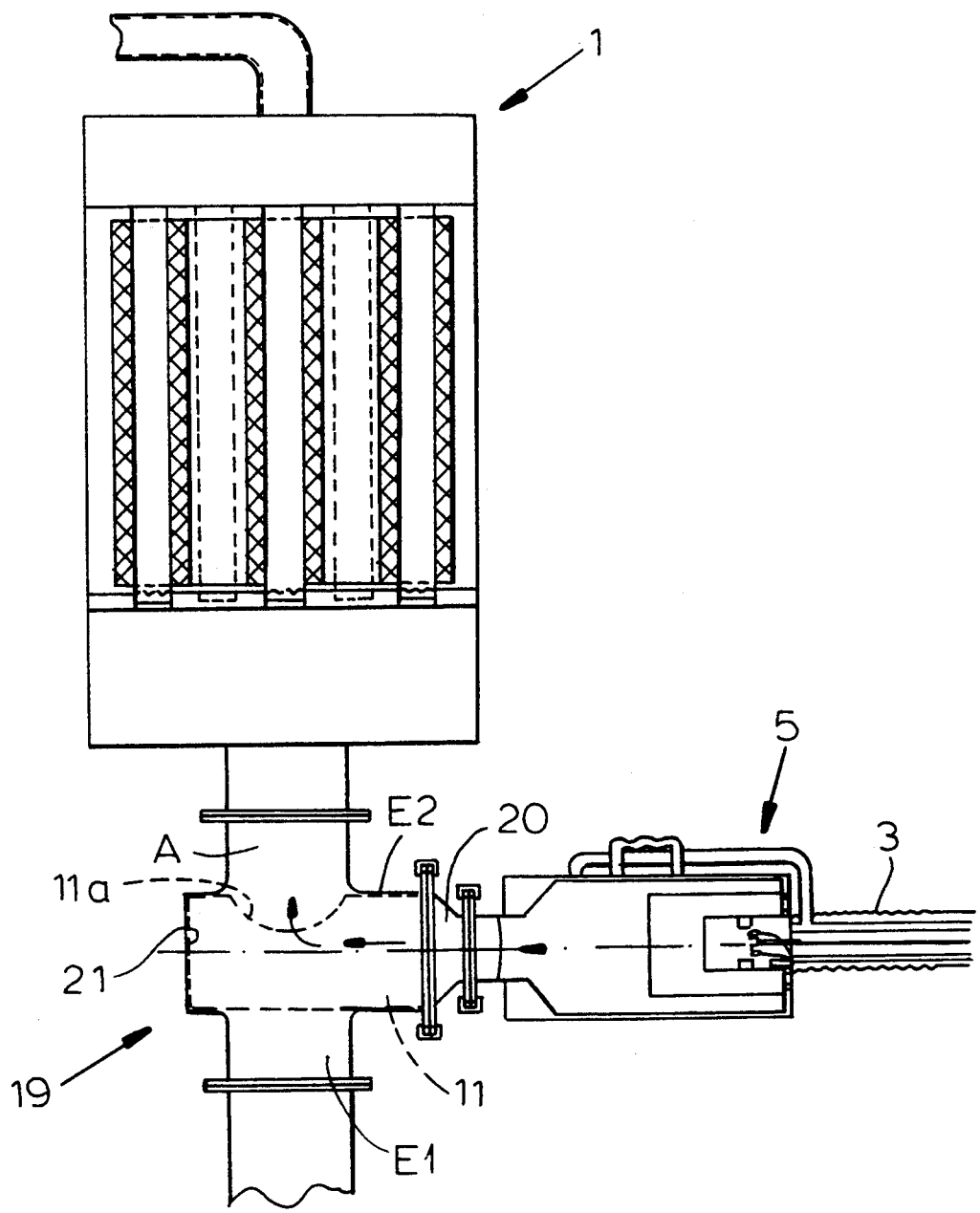
FIG. 4 is a similar section which shows the third embodiment with a thicker exhaust pipe.

In the third embodiment (FIGS. 3 and 4) the first inlet E1, the exhaust gas inlet and the outlet A (to the filter) are in alignment with one another, and the second inlet E2 (hot gas inlet) discharges at right angles between E1 and A. The hot gas generator 5 is therefore inserted into the second inlet E2 with its pipe 11 at right angles to the pipes of E1 and A. The hot gas flows from the hot gas generator 5 via a lateral opening 11a in the pipe 11 into the outlet A. The rest of the wall of the pipe 11 closes the first inlet E1.

The branch 19 has on the inside a recess 21 whose internal diameter corresponds to the external diameter of the pipe 11 and in which the free end of the pipe 11 is disposed. The pipe 11 is connected to the hot gas generator 5 via an intermediate coupling member 20. As a result, pipes 11 of different diameter can be releasably attached to the intermediate coupling member 20 on the side remote from the hot gas generator 5.

I claim:

1. A soot filter system, comprising:
    a soot filter regeneratable by passage of hot air therethrough to burn off collected soot particles and attached to a motor vehicle having a diesel engine producing an exhaust gas containing said soot particles;
    means forming a first inlet connected to said soot filter and receiving said exhaust gas from said diesel engine;
    means forming a second inlet connected to said soot filter; and
    an external mobile hot gas generator separate from said motor vehicle and detachably connectable to said second inlet while said soot filter remains attached to said motor vehicle for passing hot air through said soot filter to burn off accumulated soot particles and regenerate said soot filter, the means forming said first and second inlets being constructed and arranged to close off said first inlet from said diesel engine while said hot air is passed through said soot filter from said external mobile hot gas generator.

2. The soot filter system defined in claim 1 in which said soot filter is provided with a pipe, said first inlet being formed by one branch from said pipe and said second inlet being formed by a second branch from said pipe.

3. The soot filter system defined in claim 2 wherein said hot gas generator is formed with another pipe insertable in said second inlet and blocking said first inlet.

4. The soot filter system defined in claim 3 wherein said second inlet is transverse to said first inlet and the pipe connected to said filter and the pipe of said hot gas generator has a lateral opening communicating with the pipe connected to said filter.

5. The soot filter system defined in claim 3 wherein said second inlet is in line with the pipe connected to said filter and said pipe of said hot gas generator communicates at a free end with the pipe connected to said filter.

6. The soot filter system defined in claim 1 further comprising an intermediate coupling member connecting said hot gas generator to said second inlet.

7. The soot filter system defined in claim 6 wherein pipes of different diameter are releasably attachable to said intermediate coupling member.

8. The soot filter system defined in claim 1 wherein said hot gas generator has a pipe receivable in said second inlet and said second inlet has an internal diameter substantially corresponding to an external diameter of the pipe.

9. The soot filter system defined in claim 1 wherein said mobile hereof gas generator includes a carriage, provided with a fuel tank and a burner for fuel from said tank and connected thereto.

10. The soot filter system defined in claim 9 wherein said burner is mounted on said carriage, further comprising a flexible hose connecting a hot air outlet of said burner to said second inlet.

11. The soot filter system defined in claim 9 wherein said burner is mounted at the end of a line connecting said burner to said carriage and is formed with a rigid pipe receivable in said second inlet.

* * * * *